United States Patent
Amamiya

(10) Patent No.: US 8,068,946 B2
(45) Date of Patent: Nov. 29, 2011

(54) HYBRID VEHICLE AND CONTROL METHOD THEREOF

(75) Inventor: Sumiko Amamiya, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 366 days.

(21) Appl. No.: 11/918,350

(22) PCT Filed: Dec. 21, 2006

(86) PCT No.: PCT/IB2006/003728
§ 371 (c)(1),
(2), (4) Date: Oct. 12, 2007

(87) PCT Pub. No.: WO2007/074367
PCT Pub. Date: Jul. 5, 2007

(65) Prior Publication Data
US 2009/0024262 A1  Jan. 22, 2009

(30) Foreign Application Priority Data
Dec. 26, 2005 (JP) .................... 2005-371590

(51) Int. Cl.
*B60L 9/00* (2006.01)
(52) U.S. Cl. .......................................... 701/22
(58) Field of Classification Search .......... 701/22, 701/81; 180/174–179, 202, 6.28, 6.5, 214, 180/216, 218, 242, 279, 53.5, 60, 65.1–65.8, 180/407, 412, 415, 422, 443; 280/735, 707, 280/422; 340/428; 318/139–158
See application file for complete search history.

(56) References Cited

U.S. PATENT DOCUMENTS

| | | | | |
|---|---|---|---|---|
| 4,484,653 A | * | 11/1984 | Horikoshi et al. | 180/233 |
| 5,927,415 A | * | 7/1999 | Ibaraki et al. | 180/65.25 |
| 6,295,487 B1 | * | 9/2001 | Ono et al. | 701/22 |
| 6,721,647 B1 | * | 4/2004 | Kita et al. | 701/106 |
| 2001/0008192 A1 | * | 7/2001 | Morisawa | 180/197 |
| 2004/0034461 A1 | * | 2/2004 | Kadota | 701/67 |
| 2004/0102887 A1 | * | 5/2004 | Lin et al. | 701/70 |
| 2004/0134698 A1 | | 7/2004 | Yamamoto et al. | |
| 2004/0135527 A1 | | 7/2004 | Tatara et al. | |

FOREIGN PATENT DOCUMENTS
JP    A 11-208304    8/1999
WO    WO 00/05094    2/2000

* cited by examiner

Primary Examiner — James Trammell
Assistant Examiner — Muhammad Shafi
(74) Attorney, Agent, or Firm — Oliff & Berridge, PLC

(57) ABSTRACT

A hybrid vehicle is provided with means for setting a four-wheel drive condition which is a condition for switching from two-wheel drive to four-wheel drive, and an EV switch which, when turned on by an occupant of the vehicle, places the vehicle in an EV driving mode in which only an electric motor is used as the power source. The four-wheel drive condition setting means changes the four-wheel drive condition to reduce a region in which the vehicle operates in four-wheel drive when the EV switch is on as compared to when the EV switch is off. As a result, the vehicle operates in two-wheel drive more frequently, thus reducing power consumption.

9 Claims, 2 Drawing Sheets

HYBRID VEHICLE AND CONTROL METHOD THEREOF

BACKGROUND OF THE INVENTION

1. Field of the Invention

The invention relates to a hybrid vehicle provided with an internal combustion engine and an electric motor as power sources, in which front wheels and rear wheels are driven independently from each other by the electric motor, and a control method of that hybrid vehicle. More particularly, the invention relates to a switching control apparatus which switches between two-wheel drive in which either the front wheels or the rear wheels are driven, and four-wheel drive in which both the front wheels and the rear wheels are driven, as well as a control method thereof.

2. Description of the Related Art

Some hybrid vehicles provided with an internal combustion engine and an electric motor that can also generate electricity (hereinafter referred as "electric motor") as power sources are structured such that the front wheels and the rear wheels are driven independently from each other using the electric motor. For example, one known hybrid vehicle is structured such that the front wheels are driven by the internal combustion engine and the electric motor and the rear wheels are driven by another electric motor other than one that drives the front wheels. In such a hybrid vehicle, two driving methods can easily be realized simply by switching between operating and not operating one of the electric motors from among the electric motor provided for the front wheels and the electric motor provided for the rear wheels. These driving methods are two-wheel drive in which either only the front wheels or only the rear wheels are driven, and four-wheel drive in which both the front wheels and the rear wheels are driven.

Which of these two driving methods is to be used depends on control variables relating to vehicle running, such as vehicle speed, the gradient of the road on which the vehicle is running, the driving force required by the vehicle, vehicle steering angle, and the difference in rotation speed between the front and rear wheels. Four-wheel drive is used when a large driving force is required such as when taking off from a standstill, accelerating, or climbing a hill, or when running on a road with a low coefficient of friction such as an icy road. By distributing the driving force required by the vehicle between all four wheels, driving force is able to be reliably transmitted between each wheel and the road surface. On the other hand, two-wheel drive is generally used when not much driving force is required by the vehicle and the vehicle is driven on roads with a sufficiently high coefficient of friction. Running in two-wheel drive consumes less fuel and power than running in four-wheel drive as long as the wheels do not slip. With a hybrid vehicle such as that described above, two-wheel drive only requires that electric power be supplied to the electric motor for only one set of wheels, i.e., only either the electric motor for the front wheels or the electric motor for the rear wheels. Therefore, the electrical loss between the secondary battery and the electric motor is low, thereby enabling power consumption to be reduced when driving the vehicle.

Also, hybrid vehicles realize various driving modes by using the internal combustion engine and the electric motor selectively or in combination. Some examples of these driving modes include an "HV driving mode" which uses the internal combustion engine and the electric motor together as the driving source, an "engine driving mode" which uses only the internal combustion engine as the driving source, and an "EV driving mode" which uses only the electric motor as the driving source. These driving modes can be automatically switched successively depending on the state-of-charge (hereinafter simply referred to as "SOC") of the secondary battery that supplies electric power to the electric motor, and the required driving force and the like.

Some hybrid vehicles having these kinds of driving modes are provided with an "EV switch" in the vehicle cabin to enable an occupant to intentionally select the "EV driving mode". When the EV switch is turned on, the vehicle is placed in the EV driving mode. For example, international publication No. 00/05094 pamphlet proposes providing a lever in the vehicle which enables an occupant to switch from driving using the internal combustion engine as the driving source (i.e., engine driving mode and HV driving mode) to the EV driving mode. The occupant forcibly places the vehicle in the EV driving mode by operating this EV switch or lever. As a result, vehicle is able to run quietly because it is running in the EV driving mode, i.e., without using the internal combustion engine. Accordingly, this EV switch is useful at times such as when driving through residential districts at night.

When the hybrid vehicle is running in the EV driving mode, i.e., running using only the electric motor as the power source, the electric power supplied from the secondary battery to the electric motor becomes the power that drives the vehicle. Therefore, the cruising distance of the vehicle when driving in the EV driving mode is determined by the SOC of the secondary battery. When the SOC of the secondary battery decreases from continuously driving in the EV driving mode, the internal combustion engine must be operated to charge the secondary battery. At this time, the EV driving mode is automatically cancelled by a control apparatus of the vehicle. That is, the EV switch is turned off and the internal combustion engine is started.

In this way, even if the occupant selects the EV driving mode with the EV switch, the EV driving mode may soon be cancelled due to a low SOC of the secondary battery, which is problematic in terms of merchantability. To counteract this, it is possible to increase the cruising distance in the EV driving mode by increasing the size of the secondary battery but this would increase the weight of the secondary battery and the space required to mount the secondary battery. Therefore, when the driver operates the EV switch and switches the driving mode to the EV driving mode, it is desirable to reduce the power consumption of the electric motor as much as possible in order to increase the cruising distance in the EV driving mode.

In a hybrid vehicle which is able to run while switching successively between four-wheel drive and two-wheel drive such as that described above as well, the condition for switching between two and four wheel drive, i.e., the region in which the vehicle operates in four-wheel drive, is set appropriately beforehand by testing corresponding to control variables relating to vehicle running. The region in which the vehicle operates in four-wheel drive is normally set to emphasize power performance and does not consider reducing power consumption when driving in the EV driving mode that was selected by the occupant operating the EV switch. Therefore, there is a demand for technology that enables power consumption to be reduced in the EV driving mode that was selected with the EV switch while satisfying the power performance during normal driving.

SUMMARY OF THE INVENTION

This invention provides a hybrid vehicle in which power consumption is able to be reduced when an EV switch is on, as well as a control method of that hybrid vehicle.

A first aspect of the invention relates to a hybrid vehicle. This hybrid vehicle is provided with four-wheel drive condition setting means for setting a four-wheel drive condition which is a condition for switching from two-wheel drive in which one set of wheels, from among front wheels and rear wheels, is driven to four-wheel drive in which both the front wheels and the rear wheels are driven, and an EV switch which, when turned on by an occupant of the vehicle, places the vehicle in an EV driving mode in which only an electric motor is used as the power source. The four-wheel drive condition setting means changes the four-wheel drive condition to reduce a region in which the vehicle operates in four-wheel drive when the EV switch is on as compared to when the EV switch is off. When the EV switch is on, i.e., when the vehicle is running in the EV driving mode that was selected by the occupant of the vehicle operating the EV switch, the region in which the vehicle operates in four-wheel drive is reduced compared to when running normally, and the region in which the vehicle operates in two-wheel drive increases proportionately. As a result, the vehicle operates in two-wheel drive more frequently, thus reducing power consumption.

The four-wheel drive condition may include a condition that a slip ratio calculated by the difference in rotation speeds between the front wheels and the rear wheels be equal to or greater than a determining slip ratio which is a predetermined threshold value, and the four-wheel drive condition setting means may set the determining slip ratio to a higher value when the EV switch is on than when the EV switch is off.

The four-wheel drive condition may also include a condition that, when the vehicle is taking off from a standstill, a road gradient at that time be equal to or greater than a determining road gradient which is a predetermined threshold value, and a condition that a speed of the vehicle be equal to or less than a determining vehicle speed which is a predetermined threshold value, and the four-wheel drive condition setting means may set the determining road gradient to a higher value and set the determining vehicle speed to a lower value when the EV switch is on than when the EV switch is off.

Also, the four-wheel drive condition setting means may include condition change determining means for determining whether the four-wheel drive condition when the EV switch is off should be changed to the four-wheel drive condition when the EV switch is on. The condition change determining means prohibits the four-wheel drive condition from being changed when the slip ratio is equal to or greater than the predetermined threshold value or when the road gradient is equal to or greater than the predetermined threshold value.

This first aspect of the invention enables power consumption to be reduced in a hybrid vehicle when running in the EV driving mode selected with the EV switch.

A second aspect of the invention relates to a control method of a hybrid vehicle which is provided with an internal combustion engine and an electric motor as power sources and in which front wheels and rear wheels are driven independently from each other by the electric motor. This control method is characterised by including the steps of determining whether an EV switch which, when turned on by an occupant of the vehicle, places the vehicle in an EV driving mode in which only the electric motor is used as the power source, is turned on; and changing a four-wheel drive condition, which is a condition for switching from two-wheel drive in which one set of wheels, from among the front wheels and the rear wheels, is driven to four-wheel drive in which both the front wheels and the rear wheels are driven, to reduce a region in which the vehicle operates in four-wheel drive when the EV switch is on as compared to when the EV switch is off.

This second aspect of the invention enables power consumption to be reduced in a hybrid vehicle when running in the EV driving mode selected with the EV switch.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments. A hybrid vehicle in which the front wheels are driven by an internal combustion engine and an electric motor and the rear wheels are driven by another electric motor will be described as one example.

Figure 1:
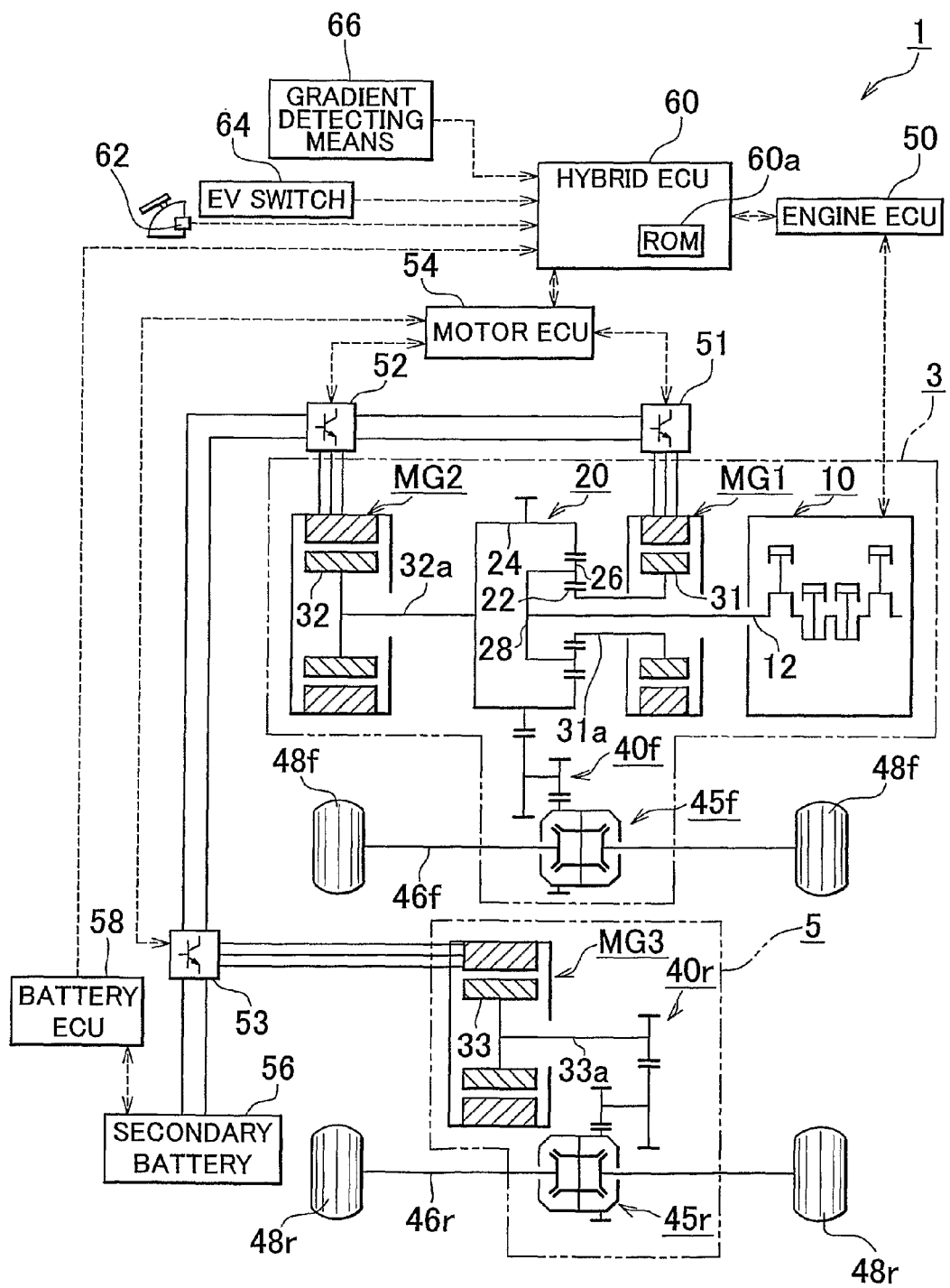
FIG. 1 schematically shows a hybrid vehicle according to one example embodiment of the invention.

First the structure of a hybrid vehicle 1 according to this example embodiment will be described with reference to FIG. 1. FIG. 1 is a representative view of the schematic structure of the hybrid vehicle 1. In order to drive the hybrid vehicle 1, it is provided with a front wheel drive unit 3 that drives front wheels 48f and a rear wheel drive unit 5 that drives rear wheels 48r. The front wheel drive unit 3 includes as power sources an internal combustion engine 10 and electric motors MG1 and MG2 which are capable of generating electricity. Meanwhile, the rear wheel drive unit 5 includes as a power source an electric motor MG3. Accordingly, the front wheels 48f and the rear wheels 48r are driven independently from one another.

The internal combustion engine 10 has a fuel injection device, an ignition device, and a throttle valve, none of which are shown. These devices are controlled by an engine electronic control unit (hereinafter referred to as "engine ECU"). Therefore, the engine ECU can adjust the power generated by the internal combustion engine 10 which is then output from a crankshaft 12.

Meanwhile, the electric motors MG1, MG2, and MG3 are all so-called motor-generators which are able to function as both electric motors that convert the supplied electricity into power and generators that convert input power into electricity. An inverter 51, 52, and 53 provided for each of the electric motors MG1, MG2, and MG3, respectively, control the switching of these functions and the mechanical power generated by the electric motors MG1, MG2, and MG3 or the power recovered by the electric motors MG1, MG2, and MG3. These inverters 51, 52, and 53 are all connected to a secondary battery 56 such that electricity can be transferred between the secondary battery 56 and each of the electric motors MG1, MG2, and MG3. This transfer of electricity is controlled by a motor electronic control unit (hereinafter referred to as "motor ECU") 54. Accordingly, the motor ECU 54 can control the electric motors MG1, MG2, and MG3 via the inverters 51, 52, and 53. Power generated by the electric motors MG1, MG2, and MG3 is then output from rotating shafts 31a, 32a, and 33a which are coupled to rotors 31, 32, and 33 of the electric motors MG1, MG2, and MG3, respectively.

In the front wheel drive unit 3, in addition to the internal combustion engine 10 and the electric motors MG1 and MG2 described above, a planetary gear set 20 which divides the power output from the internal combustion engine 10, a reduction gear 40f which increases torque by slowing the rotation transmitted from the planetary gear set 20, and a differential gear 45f which distributes power transmitted from the reduction gear 40f to left and right drive axles 46f are integrally coupled together. The electric motor MG1 is mainly used as a generator while the electric motor MG2 is mainly used as an electric motor.

The crankshaft 12 of the internal combustion engine 10 is coupled to a planetary carrier 28 of the planetary gear set 20, the rotor 31 of the electric motor MG1 is coupled to a sun gear 22 of the planetary gear set 20, and the rotor 32 of the electric motor MG2 is coupled to a ring gear 24 of the planetary gear set 20. Power output by the internal combustion engine 10 from the crankshaft 12 is divided into power transmitted to the sun gear 22 and power transmitted to the ring gear 24. The power transmitted from the internal combustion engine 10 to the sun gear 22 is transmitted to the electric motor MG1 where it is used to generate electricity. Meanwhile, the power transmitted from the internal combustion engine 10 to the ring gear 24 is combined with power output from the electric motor MG2 and then transmitted from the ring gear 24 to the reduction gear 40f. The power transmitted from the reduction gear 40f to the differential gear 45f is then distributed to the left and right drive axles 46f to drive the front wheels 48f.

By structuring the front wheel driving unit 3 in this way, the electric motor MG2 generates mechanical power from the electricity supplied by the secondary battery 56. That mechanical power is then used to drive the front wheels 48f, thus propelling the vehicle 1. Also, during deceleration of the vehicle, the mechanical power transmitted from the front wheels 48f to the electric motor MG2 can be converted into electricity and recovered by the secondary battery 56.

On the other hand, in the rear wheel drive unit 5, in addition to the electric motor MG3 described above, a reduction gear 40r that increases torque by slowing the rotation transmitted from the electric motor MG3 and a differential gear 45r that distributes power transmitted from the reduction gear 40r to left and right drive axles 46r are integrally coupled together. Power output from the electric motor MG3 is transmitted from the reduction gear 40r to the differential gear 45r where it is distributed to the left and right drive axles 46r to drive the rear wheels 48r.

By structuring the rear wheel driving unit 5 in this way, the electric motor MG3 generates mechanical power from the electricity supplied by the secondary battery 56, similar to the electric motor MG2. That mechanical power is then used to drive the rear wheels 48r, thus propelling the vehicle 1. Also, during deceleration of the vehicle, the mechanical power transmitted from the rear wheels 48r to the electric motor MG3 can be converted into electricity and, recovered by the secondary battery 56.

The hybrid vehicle 1 is also provided with a hybrid electronic control unit (hereinafter referred to as "hybrid ECU") 60 that controls the entire system of the vehicle 1. In addition, the vehicle 1 is provided with an accelerator position sensor 62 that detects a depression amount of an accelerator pedal and outputs an accelerator opening amount signal to the hybrid ECU 60. The hybrid ECU 60 then calculates a driving force required by the vehicle (hereinafter referred to as "required driving force") according to the accelerator opening amount signal that was input. Based on this calculated required driving force, the hybrid ECU 60 then determines the power to be generated by the internal combustion engine 10 and the electric motors MG1, MG2, and MG3, and outputs commands indicative thereof to the engine ECU 50 and the motor ECU 54 described above. Upon receiving the commands, the engine ECU 50 and the motor ECU 54 control the internal combustion engine 10 and the electric motors (MG1, MG2, MG3) accordingly. In this way, the internal combustion engine 10 and the electric motors (MG1, MG2, MG3) are controlled to operate in coordination with one another according to the running state of the vehicle, including when the vehicle is stopped.

The hybrid vehicle 1 is also provided with a battery monitoring unit (hereinafter referred to as "battery ECU") 58 that monitors the state of the secondary battery and outputs a signal indicative of the state-of-charge (hereinafter referred to as "SOC") of the secondary battery 56 to the hybrid ECU 60. Then based on this SOC of the secondary battery and the calculated required driving force, the hybrid ECU 60 automatically switches the driving mode appropriately between an "HV driving mode" in which the internal combustion engine 10 and the electric motors (MG1, MG2, MG3) are used together as the power source, an "engine driving mode" in which only the internal combustion engine 10 is used as the driving source, and an "EV driving mode" in which only the electric motors (MG1, MG2, MG3) are used as the power source.

The hybrid vehicle 1 is also provided with an EV switch 64 that enables an occupant of the vehicle 1 to intentionally select the EV driving mode. This EV switch 64 is provided in a location accessible by the occupant of the vehicle, such as on an instrument panel in the vehicle cabin. When the occupant turns the EV switch 64 on, it is detected by the hybrid ECU 60. The hybrid ECU 60 which has detected that the EV switch 64 has been turned on then controls the internal combustion engine 10 so that it is not operated, while performing control to achieve the required driving force by operating only the electric motors MG2 and MG3. In this manner, by turning the EV switch 64 on, the vehicle can be forcibly placed in the EV driving mode in which only the electric motors MG2 and MG3 are used as the power source.

The EV driving mode which is selected by the occupant of the vehicle switching the EV switch 64 on in this manner will hereinafter be referred to as "selected EV driving mode". In contrast, the EV driving mode that is established when the hybrid ECU 60 automatically switches from another driving mode (such as the engine driving mode or the HV driving mode) will be referred to as "automatic EV driving mode" in order to distinguish it from the selected EV driving mode.

When the SOC of the secondary battery 56 is low due to continuous running in the selected EV driving mode or when a driving force of a magnitude unable to be achieved in the EV driving mode is required, the hybrid ECU 60 automatically turns off the EV switch 64 and the hybrid vehicle 1 switches to the HV driving mode or the engine driving mode.

A wheel speed sensor, not shown, which detects the rotation speed of a wheel is provided for all four wheels (48f and 48r) of the hybrid vehicle 1. The hybrid ECU 60 receives wheel rotation speed signals from these wheel speed sensors and then calculates a front wheel rotation speed, which is the average value of the rotation speeds of the left and right front wheels 48f, and a rear wheel rotation speed, which is the average value of the rotation speeds of the left and right rear wheels 48r. The speed of the vehicle 1 (hereinafter referred to as "vehicle speed") is then determined from either the calculated front wheel rotation speed or the calculated rear wheel rotation speed.

Moreover, the hybrid ECU 60 also calculates a slip ratio from the difference between the front wheel rotation speed and the rear wheel rotation speed. When the front wheel rotation speed is greater than the rear wheel rotation speed, the quotient of the front wheel rotation speed divided by the rear wheel rotation speed becomes the front wheel slip ratio. When the rear wheel rotation speed is greater than the front wheel rotation speed, the quotient of the rear wheel rotation speed divided by the rotation speed of the front wheels 48f becomes the rear wheel slip ratio. Hereinafter, the front wheel slip ratio and the rear wheel slip ratio will simply be referred to as "slip ratio". The slip ratio may be calculated by another electronic control unit, not shown, and the calculation results may be input to the hybrid ECU 60.

Further, the hybrid vehicle 1 is also provided with gradient detecting means 66 for detecting a gradient of the road under the vehicle 1. This gradient detecting means 66 outputs a signal indicative of the road gradient to the hybrid ECU 60. A sensor, not shown, that can detect acceleration of the vehicle 1 may output a signal indicative of acceleration in the longitudinal direction of the vehicle to the hybrid ECU 60 which may then estimate the road gradient based on the acceleration signal when the vehicle is stopped.

As described above, the hybrid ECU 60 inputs or calculates the control variables related to vehicle running, such as the vehicle speed, the road gradient, and the slip ratio. Then based on these control variables, the hybrid ECU 60 switches between two-wheel drive in which only either the front wheels 48f or the rear wheels 48r are driven and four-wheel drive in which both the front wheels 48f and the rear wheels 48r are driven. The hybrid ECU 60 switches between two-wheel drive and four-wheel drive by determining whether the running state of the vehicle 1 corresponds to a two-wheel drive operating region or a four-wheel drive operating region based on the values of the control variables related to running. The condition for switching between two-wheel drive and four-wheel drive (hereinafter referred to as "four-wheel drive condition") includes a plurality of predetermined conditions. Each condition is defined by the relationship between a control variable relating to running that was either received by the hybrid ECU 60 or calculated by the hybrid ECU 60 and a predetermined threshold value, i.e., a control constant, which was set in advance. The control constant is stored in ROM 60a of the hybrid ECU 60 beforehand.

Figure 2:
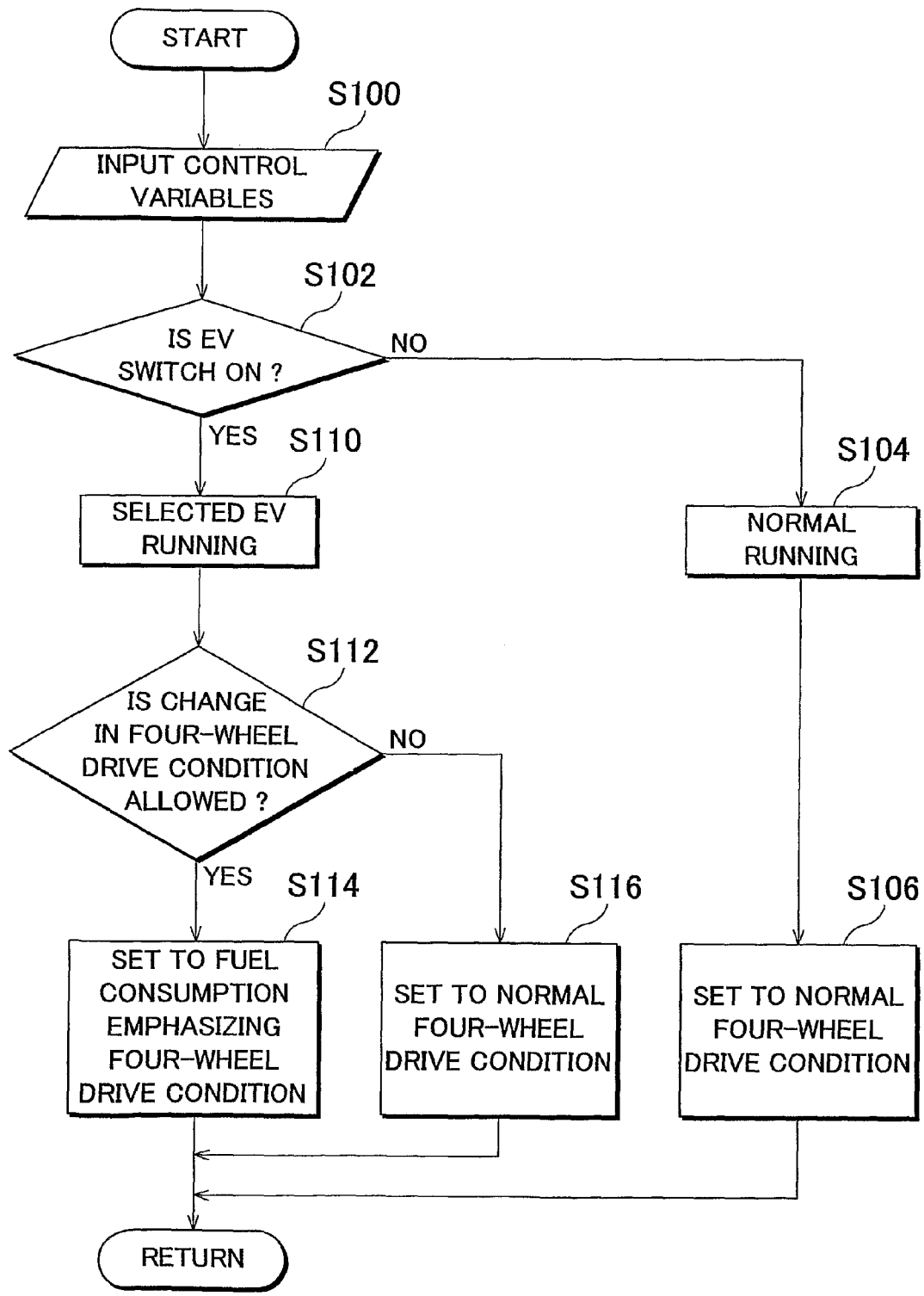
FIG. 2 is a flowchart illustrating control executed in the hybrid vehicle according to the example embodiment.

Hereinafter, the method for setting the four-wheel drive condition of this example embodiment, i.e., the control constant that makes up that condition, will be described with reference to FIG. 2. FIG. 2 is a flowchart illustrating control for setting the four-wheel drive condition, which is executed by the hybrid ECU 60. In this example embodiment, when the EV switch 64 is turned on, the control constant of the four-wheel drive condition changes so that the region in which the vehicle operates in four-wheel drive (i.e., the four-wheel drive operating region) becomes smaller.

First, the hybrid ECU 60 inputs control variables related to vehicle running from the various sensors and electronic control units described above (step S100). In addition to the vehicle speed, road gradient, and slip ratio, the control variables also include information relating to, for example, the SOC of the secondary battery 56, the required driving force, and whether the EV switch 64 is on or off.

The hybrid ECU 60 then determines whether the EV switch 64 is on (step S102). If an occupant of the vehicle has turned the EV switch 64 on, the process continues on to step S110. If, on the other hand, the EV switch 64 has not been turned on, i.e., is off, or the hybrid ECU 60 has automatically turned the EV switch 64 off due to a low SOC of the secondary battery 56 regardless of whether it was originally turned on by the occupant, the process proceeds on to step S104.

When the EV switch 64 is off, the hybrid vehicle 1 runs in a "normal driving mode" (step S104). The "normal driving mode" in this case includes the engine driving mode in which only the internal combustion engine 10 is selected and used as the power source, the HV driving mode in which the internal combustion engine 10 and the electric motors (MG1, MG2, MG3) are used together as the power source, and the automatic EV driving mode in which only the electric motors (MG1, MG2, MG3) are selected and used as the power source due to the hybrid ECU 60 switching modes automatically, i.e., this mode is not initiated by the occupant turning the EV switch on. The hybrid ECU 60 automatically switches between these modes successively depending on the SOC of the secondary battery 56 and the required driving force.

At this time, the hybrid ECU 60 sets the four-wheel drive condition to a "normal four-wheel drive condition" (step S106). This normal four-wheel drive condition includes both a condition that the slip ratio (a control variable) be equal to or greater than a determining slip ratio (control constant), which is a predetermined threshold value, of 0.05, and a condition that the road gradient (a control variable) when the vehicle takes off from a standstill on a hill be equal to or greater than a determining road gradient, which is a predetermined threshold value, of 6 degrees and the vehicle speed (a control variable) be equal to or less than a determining vehicle speed (a control variable), which is a predetermined threshold value, of 25 km/h. When at least one of these conditions is satisfied, the hybrid ECU 60 performs control to drive both the front wheels 48f and the rear wheels 48r such that the hybrid vehicle 1 operates in four-wheel drive.

If, on the other hand, it is determined in step S102 that the EV switch 64 is on, then the hybrid vehicle 1 runs in the selected EV driving mode (step S110). The hybrid vehicle 1 continues to run in the selected EV driving mode until the SOC of the secondary battery 56 drops to equal to or less than a predetermined value or unless power that is greater than can be achieved in the EV driving mode is required.

In this case, it is determined whether the four-wheel drive condition should be changed from the normal four-wheel drive condition to a "fuel consumption emphasizing four-wheel drive" which will be described later (step S112). For example, when the slip ratio is equal to or greater than 0.07 or when the gradient of the road on which the vehicle is traveling is equal to or greater than 7 degrees, the condition is prohibited from changing from the normal four-wheel drive condition to the fuel consumption emphasizing four-wheel drive condition and the process proceeds on to step S116. In any other case, however, the change in the four-wheel drive condition is allowed and the process proceeds on to step S114.

In step S114, the hybrid ECU 60 sets the four-wheel drive condition to the fuel consumption emphasizing four-wheel drive condition (step S114). This fuel consumption emphasizing four-wheel drive condition includes, for example; a condition that the slip ratio be equal to or greater than a determining slip ratio, which is a predetermined threshold value, of 0.10, and a condition that the road gradient when the vehicle is taking off from a standstill on a hill be equal to or greater than a determining road gradient, which is a predetermined threshold value, of 8 degrees and the vehicle speed be 5 km/h or less. In this fuel consumption emphasizing four-wheel drive condition, the determining slip ratio and the determining road gradient at which the mode is switched from two-wheel drive to four-wheel drive are set at higher values than they are in the normal four-wheel drive condition. In addition, the determining vehicle speed at which the mode is switched from four-wheel drive to two-wheel drive when taking off from a standstill on a hill is set to a lower value than it is in the normal four-wheel drive condition.

By changing the condition to this kind of fuel consumption emphasizing four-wheel drive condition, with the vehicle 1 that is operating in two-wheel drive, even if the values of the control variables such as the slip ratio and the road gradient increase due to a change in the running state, it is more difficult to reach the determining slip ratio and the determining road gradient so the vehicle 1 does not switch into four-wheel drive as readily as it does in the normal four-wheel drive condition. In addition, with the vehicle 1 that was operating in four-wheel drive when taking off from a standstill on a hill, if the vehicle speed is increased, it is easier to reach the determining vehicle speed and thus easier to return to two-wheel drive from four-wheel drive in the fuel consumption emphasizing four-wheel drive condition than it is in the normal four-wheel drive condition. That is, the fuel consumption emphasizing four-wheel drive condition changes the values of the control constants that make up the four-wheel drive condition compared with the normal four-wheel drive condition to reduce the region in which the vehicle 1 operates in four-wheel drive and proportionately increase the region in which the vehicle 1 operates in two-wheel drive.

Meanwhile in step S116, the hybrid ECU 60 sets the four-wheel drive condition to the normal four-wheel drive condition, just as it does when the EV switch 64 is off. This prevents the vehicle that was operating in four-wheel drive from suddenly switching to two-wheel drive due to the four-wheel drive condition changing from the normal four-wheel drive condition to the fuel consumption emphasizing four-wheel drive condition when the EV switch 64 is turned on while running with a high slip ratio or traveling someplace where the road gradient is steep. As a result, it is possible prevent the drivability from being adversely affected by a change in the four-wheel drive condition when the EV switch 64 has been turned on.

In the foregoing example embodiment, the four-wheel drive condition is changed to decrease the region in which the vehicle 1 operates in four-wheel drive when the EV switch 64 is on as compared to when that EV switch 64 is off. When the EV switch 64 is on, i.e., when the vehicle 1 is running in the selected EV driving mode that was selected by an occupant of the vehicle 1 operating the EV switch 64, the region in which the vehicle is operated in four-wheel drive is reduced compared to when the vehicle is traveling normally, and the region in which the vehicle is operated in two-wheel drive is increased proportionately. By changing the four-wheel drive condition in this manner, the frequency with which the vehicle 1 operates in two-wheel drive increases, thereby reducing power consumption in the selected EV driving mode. As a result, the cruising distance in the selected EV driving mode can be increased.

In this example embodiment, the four-wheel drive condition is changed by changing the values of the control constants such as the determining slip ratio, the determining road gradient, and the determining vehicle speed. The invention is not limited to this, however, as long as the four-wheel drive condition is changed such that the region in which the vehicle operates in four-wheel drive is reduced. For example, the region in which the vehicle operates in four-wheel drive may be reduced by changing the actual type of parameter that makes up the four-wheel drive condition.

Also in the foregoing example embodiment, the condition for determining whether to change the four-wheel drive condition (hereinafter referred to as "condition change determination") is determined by the slip ratio and the road gradient while the vehicle is running. The condition change determination is not limited to this condition, however, as long as the four-wheel drive condition is prohibited from changing when the drive method attempts to change to two-wheel drive at the moment when the four-wheel drive condition changes to the fuel consumption emphasizing four-wheel drive condition when the EV switch 64 has been turned on. For example, when the EV switch is turned on while the vehicle is operating in four-wheel drive, the change in the four-wheel drive condition may be deferred until after the running state of the vehicle changes and the vehicle has switched from four-wheel drive according to the normal four-wheel drive condition to two-wheel drive.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A hybrid vehicle comprising:
an internal combustion engine as a first power source;
an electric motor as a second power source that drives front wheels and rear wheels independently from each other;
an Electric Vehicle switch that, when turned on, places the vehicle in an Electric Vehicle driving mode in which only the electric motor is used as the power source; and
a four-wheel drive condition setting device that automatically sets a four-wheel drive condition, which is a condition for switching from two-wheel drive in which one set of wheels, from among the front wheels and the rear wheels, is driven to four-wheel drive in which both the front wheels and the rear wheels are driven,
wherein a condition to change from the two-wheel drive to the four-wheel drive when the Electric Vehicle switch is on is different from a condition to change from the two-wheel drive to the four-wheel drive when the Electric Vehicle switch is off so that the four-wheel drive is less applicable when the Electric Vehicle switch is on than when the Electric Vehicle switch is off.

2. The hybrid vehicle according to claim 1, wherein the four-wheel drive condition includes a condition in which a slip ratio calculated by a difference in rotation speeds between the front wheels and the rear wheels be equal to or greater than a predetermined threshold value; and the four-wheel drive condition setting device is configured to set the predetermined threshold value to a higher value when the Electric Vehicle Switch is on than when the Electric Vehicle Switch is off.

3. The hybrid vehicle according to claim 1, wherein the four-wheel drive condition includes a condition that, when the vehicle is taking off from a standstill, a road gradient at that time be equal to or greater than a determining road gradient which is a predetermined threshold value, and a condition that a speed of the vehicle be equal to or less than a determining vehicle speed which is a predetermined threshold value; and the four-wheel drive condition setting device is configured to set the determining road gradient to a higher value and set the determining vehicle speed to a lower value when the Electric Vehicle switch is on than when the Electric Vehicle switch is off.

4. The hybrid vehicle according to claim 1, wherein the four-wheel drive condition setting device includes a condition change determining device that determines whether a four-wheel drive condition when the Electric Vehicle switch is off should be changed to the four-wheel drive condition when the Electric Vehicle switch is on; and the condition change determining device is configured to prohibit the four-wheel drive condition from being changed when a slip ratio is equal to or greater than a predetermined threshold value or when a road gradient is equal to or greater than a predetermined threshold value.

5. A control method of a hybrid vehicle that is provided with an internal combustion engine and an electric motor as power sources and in which front wheels and rear wheels are driven independently from each other by the electric motor, comprising the steps of:

determining whether an Electric Vehicle switch is turned on, wherein the Electric Vehicle switch places the vehicle in an Electric Vehicle driving mode in which only the electric motor is used as the power source; and automatically setting a four-wheel drive condition, which is a condition for switching from two-wheel drive in which one set of wheels, from among the front wheels and the rear wheels, is driven to four-wheel drive in which both the front wheels and the rear wheels are driven, wherein a condition to change from the two-wheel drive to the four-wheel drive when the Electric Vehicle switch is on is different from a condition to change from the two-wheel drive to the four-wheel drive when the Electric Vehicle switch is off so that the four-wheel drive is less applicable when the Electric Vehicle switch is on than when the Electric Vehicle switch is off.

6. The hybrid vehicle according to claim 1, wherein the four-wheel drive condition setting device is configured to automatically set the four-wheel drive condition to a fuel consumption emphasizing four-wheel drive condition to reduce an amount of time in which the vehicle operates in four-wheel drive when the Electric Vehicle switch is on as compared to when the Electric Vehicle switch is off by setting the four-wheel drive condition to a first value when the Electric Vehicle switch is off and by setting the four-wheel drive condition to a second value that is different from the first value when the Electric Vehicle switch is on, wherein the four-wheel drive condition is a condition that causes the four-wheel drive setting device to automatically switch from two-wheel drive in which either the front wheels or the rear wheels are driven, to the four-wheel drive in which both the front wheels and the rear wheels are driven.

7. The control method according to claim 5, further comprising the step of:

automatically changing the four-wheel drive condition to a fuel consumption emphasizing four-wheel drive condition, which reduces an amount of time in which the vehicle operates in four-wheel drive when the Electric Vehicle switch is on as compared to when the Electric Vehicle switch is off by setting the four-wheel drive condition to a first value when the Electric Vehicle switch is off and by setting the four-wheel drive condition to a second value that is different from the first value when the Electric Vehicle switch is on, wherein the four-wheel drive condition is a condition that causes the automatic changing from two-wheel drive in which either the front wheels or the rear wheels are driven, to the four-wheel drive in which both the front wheels and the rear wheels are driven.

8. The hybrid vehicle according to claim 1, wherein, when the Electric Vehicle switch is on, the four-wheel drive condition setting device is configured to automatically change the four-wheel drive condition into a fuel consumption emphasizing four-wheel drive condition, in which a condition to change from the two-wheel drive to the four-wheel drive when the Electric Vehicle switch is on is different from a condition to change from the two-wheel drive to the four-wheel drive when the Electric Vehicle switch is off.

9. The control method according to claim 5, further comprising the step of:

automatically changing the four-wheel drive condition into a fuel consumption emphasizing four-wheel drive condition when the Electric Vehicle switch is on, in which a condition to change from the two-wheel drive to the four-wheel drive when the Electric Vehicle switch is on is different from a condition to change from the two-wheel drive to the four-wheel drive when the Electric Vehicle switch is off.

\* \* \* \* \*